(12) United States Patent
Lomax

(10) Patent No.: US 6,220,290 B1
(45) Date of Patent: Apr. 24, 2001

(54) DOUBLE BLOCK AND BLEED BALL VALVES INCLUDING RETAINER COMPONENTS

(75) Inventor: Stuart Andrew Lomax, West Yorkshire (GB)

(73) Assignee: Alco Hi-Tek Ltd., West Yorkshire (GB)

( * ) Notice: Subject to any disclaimer, the term of this patent is extended or adjusted under 35 U.S.C. 154(b) by 0 days.

(21) Appl. No.: 09/581,126
(22) PCT Filed: Aug. 10, 1998
(86) PCT No.: PCT/GB98/02404
   § 371 Date: Aug. 25, 2000
   § 102(e) Date: Aug. 25, 2000
(87) PCT Pub. No.: WO98/52400
   PCT Pub. Date: Nov. 26, 1998

(30) Foreign Application Priority Data

Dec. 9, 1997 (GB) .................................................. 9725990

(51) Int. Cl.$^7$ ..................................................... F16L 29/00
(52) U.S. Cl. .............................................................. 137/613
(58) Field of Search ................................... 137/613, 614, 137/614.01, 614.02, 614.06; 251/316, 315.01

(56) References Cited

U.S. PATENT DOCUMENTS

| | | | |
|---|---|---|---|
| 3,921,656 | * 11/1975 | Meisenheimer, Jr. et al. . | 137/614.02 |
| 4,335,747 | 6/1982 | Mitsumoto et al. . | |
| 4,622,997 | * 11/1986 | Paddington ................. | 137/614.06 X |
| 5,186,202 | * 2/1993 | Meisenheimer, Jr. ....... | 137/614.02 X |
| 5,332,001 | * 7/1994 | Brown ........................... | 137/614.06 |
| 5,915,402 | * 6/1999 | Mitchell, II ................. | 137/613 X |

FOREIGN PATENT DOCUMENTS

| | | |
|---|---|---|
| 33 39 472 A1 | 5/1985 | (DE) . |
| 2 064 730 | 6/1981 | (GB) . |
| 2 271 164 | 4/1994 | (GB) . |

\* cited by examiner

*Primary Examiner*—Kevin Lee
(74) *Attorney, Agent, or Firm*—Woodard, Emhardt, Naughton, Moriarty & McNett

(57) ABSTRACT

A valve of the double block and bleed type construction comprises a first valve assembly housing a first ball valve and a second valve assembly housing a second ball valve. The first and second ball valves are independently actuable between open and closed positions. Each of the ball valves are held within the particular valve assembly by an annular retainer component. Each valve assembly has a passage through which fluid can pass when the ball valve is in an open condition and also a mating surface which is brought to bear against the mating surface of the other valve assembly to form a valve with a single joint.

21 Claims, 3 Drawing Sheets

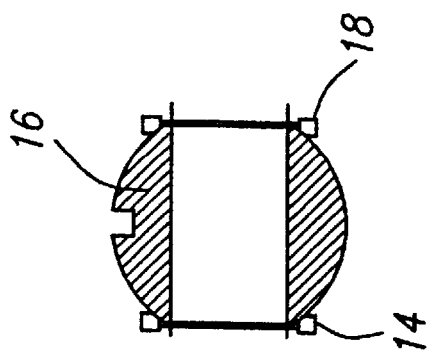
FIG. 3D
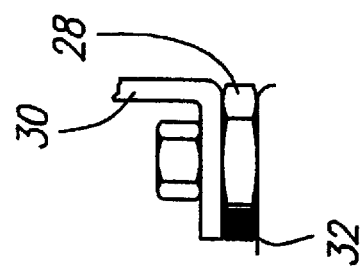
FIG. 3C
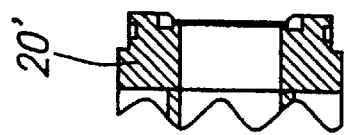
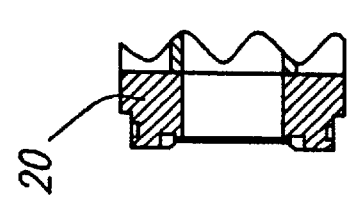
FIG. 3B
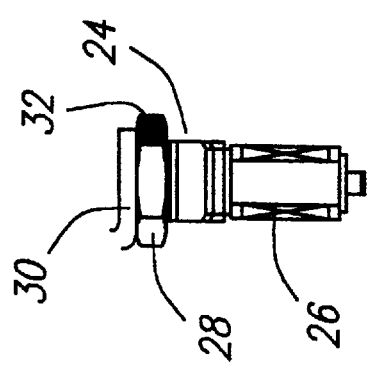
FIG. 3A

DOUBLE BLOCK AND BLEED BALL VALVES INCLUDING RETAINER COMPONENTS

BACKGROUND OF THE INVENTION

The invention to which this application relates is an improved valve construction. In particular the invention is related to improvements for the type of valve known in the trade as a double block or a double block with bleed valve (hereinafter both referred to as a double block valve). This type of valve is used in pipelines as an isolation valve and comprises first and second ball valve assemblies in an in line configuration. The provision of the two ball valve assemblies means that if one of the assemblies fails there is still another valve assembly operational.

The double block valve is commonly connected to pipelines in process, oil and gas and instrumentation industries such as refineries for carrying compressible, incompressible, or combinations of these fluids. The use of the valve is well known in the trade and can be provided to allow safe isolation of parts of the pipeline to allow repair or maintenance work and/or the connection of monitoring and/or injection apparatus. The valve is normally provided with a vent facility which is located between the two valve assemblies so as to allow for the controlled venting of the fluid carried in the pipeline and the collection of samples.

There are many different designs of double block valve assemblies but generally they comprise a valve body in which the valve components are held, with a vent formed therein. The valve body is provided with a passage therethrough, and into said passage, and from each end thereof, are fitted the respective valve assembly components of the ball, seats and seals. When the components are fitted into the passage from each end, the components are locked in position by the insertion of retaining members into each end of the passage. This design of valve has been used for a considerable period of time but has several disadvantages, in that the valve is relatively long and bulky and also that the valve has at least two joints where leakage or failure of the valve can occur. In the example described the joints are created between the retaining means inserted at each end of the passage, at which failure and leakage can occur. It is accepted that the greater the number of joints in the valve then the greater the risk of leakage occurring and, when one considers that the fluids being carried can be hot, toxic, corrosive and/or combustible, it will be appreciated that any leakage can be catastrophic.

Patent application no. 2271164 discloses an arrangement for a double block valve where there is provided a sealing element which is inserted into the valve body and which acts as a common element for both of the ball valve assemblies. This is claimed to reduce the overall length of the double block valve assembly. However the valve according to this patent still has at least two joints at which leakage can occur, these being between each of the assemblies and the intervening common valve seat.

GB2064730 describes a butterfly valve arrangement having a pair of rotateable flaps internally of the valve which are operated by a single actuation means and close simultaneously. A venting arrangement is provided in conjunction with the flaps such that the venting arrangement is opened to allow for drainage when the two flaps and thus the valve is closed. The valve is stated as being for the food and drinks industries, and is insubstantial in that a significant fluid pressure build up behind either of the flaps may burst same causing catastrophic failure.

DE3339472 discloses a valve consisting of two independently operable ball valves encased within a single housing and further having an adjustable resilient elastomeric member between and contacting the ball valve assemblies to create a seal therebetween. The resilient member is elongated between the ball valves to compress same by means of driving one or more arrow-headed members transversally into the member to deform same longitudinally. The valve is not formed from two separable assemblies, and cannot therefore be used in the gas and oil industries.

U.S. Pat. No. 4,335,747 describes a valve having two rotateable ball valves housed in separate assemblies, one of said ball valves being substantially spherical and the other being generally spherical but having a spherically arcuate recess which receives a portion of the other substantially spherical ball valve. In the closed condition, the partially spherically shaped ball valve is prevented from being rotated by the spherically shaped ball valve, and therefore not only is the operation of the ball valves dependent on one another, the removal of one of the assemblies will affect the integrity of the remaining assembly because in the closed condition, one ball valve provides support for the other.

SUMMARY OF THE INVENTION

The aim of the present invention is to provide a double block valve in which the risk of leakage and failure of the same is minimised without unduly affecting the length of the same or affecting any of the other characteristics of the same and ensuring that the valve meets the appropriate safety and manufacturing standards.

In a first aspect of the invention there is provided a valve comprising a first ball valve assembly and a second ball valve assembly, each of said first and second ball valve assemblies having a passage therethrough in which a first seal, an apertured ball valve and a second seal are disposed, said ball valves being independently actuatable between open and closed positions to allow fluid flow through the valve when both ball valves are in the open condition, characterised in that said first and second ball valve assemblies further comprise apertured retainer components lockingly inserted into each assembly to retain the ball valve component and first and second seals in each assembly and in that the assemblies are brought together to mate with one another with their respective passages substantially in alignment to form the valve with only a single joint. In one preferred embodiment the first and second ball valve assemblies are provided as contained modules which are brought together and held in position so as to form the said valve with the single joint at the interface of the said two modules.

In one preferred embodiment the assemblies are engaged in location by means of external locking means.

Typically each ball valve assembly is a self contained module. In one embodiment the module comprises a body with a passage formed therethrough said passage having a narrow end and a relatively wider end through which the components of the valve can be packed into the body, said components being the first seal, the ball valve, the second seal and the retainer. The retainer is typically inserted into engagement with the wider end of the passage once the first seal, ball and second seal are inserted into the passage and serves to hold the components in the passage and has an aperture therethrough to complete the passage through the body.

Typically the retainer is held in engagement with the body by providing threaded portions on the retainer and passage which allows the retainer to be screwed into position and also to exert any required packing force on the ball and seals against the narrower end of the passage.

To form the valve according to the invention, two of the ball valve modules are brought into mutual position such that the outer faces of the retainers, which in one embodiment lie flush with the outer face of the respective assembly bodies, are held adjacent one another with the respective passages in line, and then the assemblies are engaged in that position to form the double block valve.

It will therefore be appreciated that the only joint in the valve according to the invention is that between the adjacent end faces of the two modules.

Typically each of the valve assemblies includes a ball actuation means to allow the valve to be moved between open and closed positions. In one preferred embodiment a packing retainer is provided for the packing in the actuation means stem and said packing retainer is locked in position by means of a cam headed locking screw which is positioned adjacent a flat of the packing retainer and the cam secured in position so as to prevent accidental removal of the packing or loosening due to vibration or other means.

Preferably the stem is provided of a shape and dimension so as to allow low emission type packing to be used such as, for example, the packing sold under the trade mark Enviroflex, a trade mark of Flexitellic Limited.

Thus according to an other aspect of the invention there is provided a modular valve formed from two valve assembly modules held in engagement, each module a self contained valve assembly.

The valve formed according to this invention allows one of the modules to be removed for repair or maintenance without affecting the integrity of the other valve module. This is not possible with conventional valves of this type.

A further feature of the valve according to this invention is that a single body seal lies within the joint between respective assemblies to prevent leakage of fluid through the joint. Typically the body seal will have a continuous surface between the end faces of the valve modules which form the single joint. One suitable body seal is a metallic lens ring such as that sold under the trade mark Techlok.

In a preferred embodiment there is provided a further seal assembly which comprises a sealing element located between the retainers in the assembled valve, said sealing element acting to prevent the leakage of fluid from the passage of the valve into the joint between the retainers.

In a further aspect of the invention the valve includes a locking means which is located between the end faces of the retainers of respective valve assemblies when the valve is assembled, said locking means positioned such that relative movement of the retainers within the valve when formed is prevented.

Typically the locking means is a ring which is formed of a material which preferably has a higher degree of resilience than the body seal so as to allow compression of the locking means prior to the body seal and hence act as a means to absorb vibrationery or other forces on the retainers from causing the same to move position in the valve. This ensures that the unscrewing or loosening of the same during the service of the valves is prevented. This locking assembly can also be provided as the sealing element to prevent crevice erosion occurring and can be used in any double block valve, even with multiple joints.

In whichever embodiment of the invention the valve is typically provided with a vent assembly. Said vent assembly is provided to be operated from externally of the valve body and is in connection with the valve passage.

In one embodiment the vent assembly is connected to one of the valve modules and forms an integral part thereof. In an alternative embodiment the vent assembly can be located in a member inserted to lie between the modules when joined to form the valve. It is however preferred that the vent arrangement takes the form as shown wherein the vent assembly is connectable with one of a plurality of apertures formed in the passage wall. This connection can be a direct connection or alternatively the apertures can be connected to a common chamber to which the vent assembly or assemblies can be connected in the required location on the valve. This is described in the applicant's co-pending patent application.

In a yet further aspect of the invention there is provided a method of assembling a double block valve, said method comprising the steps of forming a first ball valve assembly module by forming a body having a passage, one end of which is of sufficient size to allow the valve components to be moved into the passage, inserting said components, comprising a ball, and sealing elements, into the passage in the required sequence, trapping the components in the passage by inserting a retainer to reduce the size of the said passage end, engaging the ball with actuating means to allow movement of the module between valve open and closed positions, repeating the process to form a second ball valve assembly module, bringing the modules together so that the end faces in which the retainers are located are adjacent and the passages in respective modules are in line and engaging the modules together to form the valve.

In a preferred embodiment a venting arrangement is fitted to either one of the modules or to a member positioned between said modules when engaged.

Thus the single joint of this invention is formed between any two major body components which in combination form the said double block valve.

Thus, a preferred embodiment of the valve can have the double block valve comprising of two full bore valve balls which is compact within the International Standard Lengths dictated by ANSI and others.

BRIEF DESCRIPTION OF THE DRAWINGS

Specific embodiments of the invention will now be described with reference to the accompanying drawings wherein;

FIGS. 3A–3D illustrate specific features of the invention in greater detail.

DETAILED DESCRIPTION OF THE PREFERRED EMBODIMENT

Figure 1:
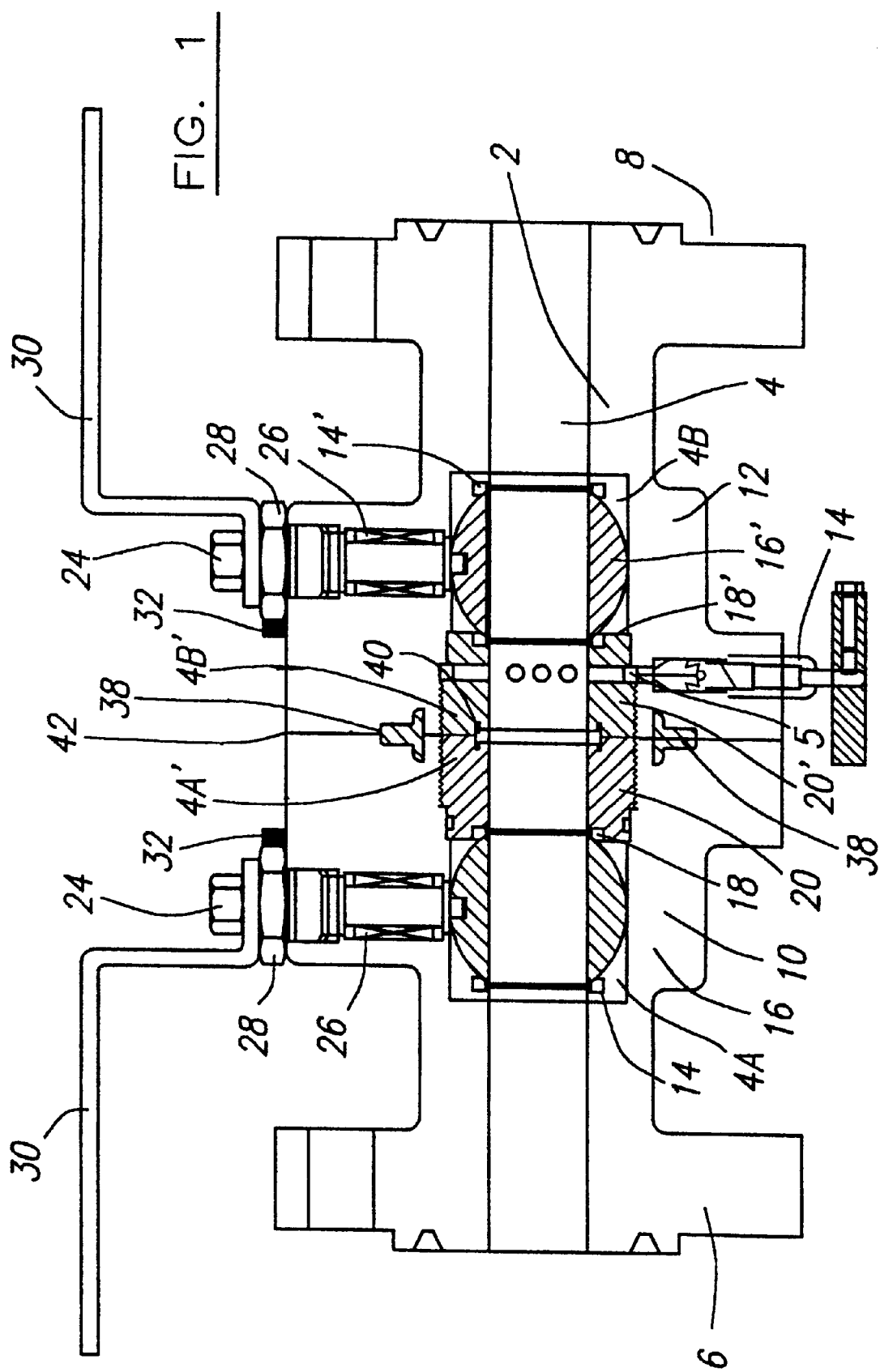
FIG. 1 illustrates a diagrammatic elevation of a double block valve according to one embodiment of the invention.

Referring now to the drawings there is shown a valve 2 according to the invention with the central portion of the passage 4 removed to show the components of the valve in section. The passage 4 passes through the length of the valve 2 and the valve is typically joined to other components such as monitoring instruments and/or a pipeline by means of flanges 6,8.

The valve shown is known as a double block and vent (bleed) valve and comprises two ball valve assembly modules 10, 12 and a vent assembly 14. The vent assembly is connected to the passage 4 via port 5 and is positioned intermediate the balls of the ball valve assembly modules 10, 12 to allow the controlled venting of fluid from the passage 4 and hence the pipeline.

The modules 10,12 are each provided with a passage 4A, 4B of larger diameter in which the valve components are located and so the passage ends 4A', 4B' are relatively larger to allow the components to be fitted into the passage when assembled.

Figure 2:
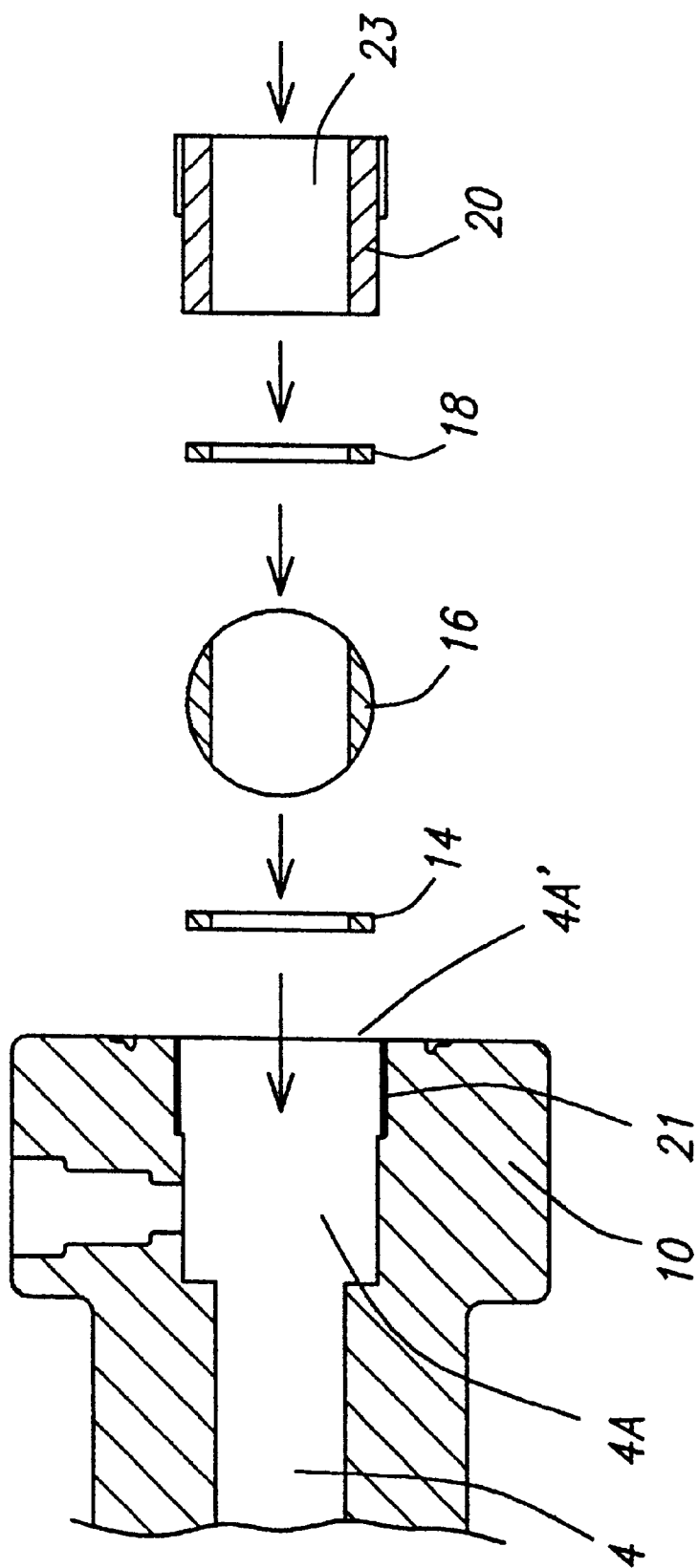
FIG. 2 illustrates the components of a modular valve assembly according to one embodiment of the invention.

Each valve module, as shown in FIG. 2 with respect to module 10, includes a first seal 14 which is first placed in position in the passage 4A and also provides fire retardant features in combination with the second seal 18 as shown in FIG. 3D. The ball 16 is then placed in position and is followed by the second seal 18. When these components are in position a retainer 20, with threaded side walls, is screwed into a threaded portion 21 of the passage through end 4A', and this serves to retain the components in position in the passage as shown in FIG. 1. The retainer has a central aperture 23 of substantially the same diameter as the passage 4 so as to ensure that there is provided a passage 4 through the valve as required. The same process is repeated for module 12 using components 14'–20'. The retainers 20,20' are provided in a mutual relationship as shown in FIG. 3B to act to lock, form seats for and retain the balls of the ball valves in position.

Each module is provided with an actuating means 24 in connection with the ball 16, 16' to allow the valve assembly to be moved between open and closed conditions. The actuating means comprises a valve stem 26 (shown in detail in FIG. 3A) connected to a packing retainer 28 and a lever 30 to allow actuation. The packing retainer is typically required to be maintained in the closed position to trap the packing in the stem 26, said packing typically low emission packing, and to ensure that the same is not accidentally moved, or influenced by vibration, is locked in position by a cam headed locking screw 32 which contacts with a flat of the packing retainer 28 (see FIG. 3C) in such a manner to ensure that the packing retainer cannot be rotated until the cam headed locking screw is first released and removed.

With each of the valve modules formed, the end faces 4A', 4B' of the same are brought into engagement and as this is done they trap a body seal 38 in position as shown and a sealing and locking means 40 in position as shown. When in position, external retaining means, not shown, act to clamp the two modular valve assemblies together to form the valve according to the invention. It will readily be appreciated that the valve formed only has one joint 42 and so the opportunity for leakage and/or failure to occur is significantly reduced in comparison to the conventional double block valves which have at least two joints.

A further advantage of the valve according to this invention is that the valve is formed from two modular assemblies, each of which can be disengaged for repair or maintenance without affecting the integrity of the other. This therefore means that a module can be removed, taken for repair in a clean environment and at the same time replaced with another module easily and quickly.

The valve according to the invention can also be manufactured to meet all relevant International Standards such as ANSI B 16.5, ANSI B16.10, ANSI B 16.34, API 6D, API Spec6FA, API 598, API 607, BS6755, EEMUA182.

What is claimed is:

1. A valve (2) comprising a first ball valve assembly (10) and a second ball valve assembly (12) each being self contained and each of said first and second ball valve assemblies having a passage (4, 6) therethrough in which a first seal (14, 14'), an apertured ball valve (16, 16') and a second seal (18, 18') are disposed, said ball valves being independently actuatable between open and closed positions to allow fluid flow through the valve when both ball valves are in the open condition, characterised in that said first and second ball valve assemblies further comprise apertured retainer components (20, 20') lockingly inserted into each assembly to retain the ball valve component and first and second seals in each assembly and in that the assemblies are connected together to mate with one another with their respective passages substantially in alignment to form the valve with only a single joint (42).

2. A valve (2) according to claim 1 characterised in that the passages (4, 6) each of said first and second ball valve assemblies (10, 12) have two different diameters (4A, 4A', 4B, 4B'), the diameter of the passage at one extremity of the assembly being less than the diameter of the passage at the alternate end thereof, the passages having the larger diameters being in the region of the end of the assemblies which are brought into mating contact.

3. A valve (2) according to claim 2 characterised in that each ball valve assembly (10, 12) is comprised of at least a first substantially annular seal (14, 14'), an apertured ball valve component (16, 16'), and a second substantially annular seal (18, 18').

4. A valve (2) according to claim 1 characterised in that each of the first and second valve assemblies (10, 12) are provided with a substantially planar mating surface.

5. A valve (2) according to claim 4 characterised in that the apertured retainer component (20, 20') is substantially flush with the mating surfaces of the first and second valve assemblies after complete insertion.

6. A valve (2) according to claim 1 characterised in that the retainer component (20, 20') is provided with threads and is screwed into corresponding threads (21) provided in the wider ends of the passages of said first and second ball valve assemblies.

7. A valve (2) according to claim 1 characterised in that the valve is provided with a continuous seal (38) which surround retainer components of the valve in the region of the single joint (42).

8. A valve (2) according to claim 1 characterised in that a seal (40) is provided in our outer surface of at least one of the retainer components, said seal being compressed by the corresponding surface of the alternate retainer component in the alternate ball valve assembly as the two valve assemblies are brought together thus preventing fluid escape through the joint.

9. A valve (2) according to claim 8 characterised in that the seal (40) is of resilient material which frictionally resists relative movement of the retainers within the valve when in a compressed condition.

10. A valve (2) according to claim 1 wherein each of the first and second ball valve assemblies (10, 12) includes an actuation means (30) connected to a stem (26) having packing (28) inserted into the assembly which allows the ball valve (16, 16') to be moved between open and closed positions.

11. A valve (2) according to claim 10 characterised in that a cam headed locking screw (32) is provided against a flat of the stem (26) or against a flat of a nut retaining said stem (26) and/or packing (28) to prevent accidental removal of the stem or packing, or loosening thereof due to vibration or other means.

12. A valve (2) according to claim 9 characterised in that the packing (28) is a low emission type packing.

13. A valve (2) according to claim 1 characterised in that a vent assembly (14) is connected within the valve in communication with the passage (4) between the ball valves (16, 16') of the first and second ball valve assemblies (10, 12).

14. A valve (2) according to claim 13 characterised in that the vent assembly (14) forms an integral part of one of the ball valve assemblies (10, 12).

15. A valve (2) according to claim 13 characterised in that the vent assembly (14) is located in a member inserted to lie between the ball valve assemblies (10, 12) when joined to form the valve.

16. A valve (2) according to claim 13 characterised in that the vent assembly (14) is connectable with one of a plurality of apertures (5) formed in the passage wall.

17. A valve (2) according to claim 13 characterised in that the plurality of apertures (5) in the passage wall all communicate with the vent via a communal chamber in which all the apertures open.

18. A valve (2) according to claim 1 characterised in that a locking means (40) is located between the end forces of the retainers of respective valve assemblies when the valve is assembled, said locking means preventing relative movement of the retainers within the valve when formed.

19. A valve (2) according to claim 18 characterised in that the locking means (40) is a ring which is formed of a material which preferably has a higher degree of resilience than the body seal (38) so as to allow compression of the locking means prior to the body seal and hence act as a means to absorb vibrationery or other forces on the retainers (20, 20') from causing the same to move position in the valve.

20. A method of assembling a double block valve (2), said method comprising the steps of forming a first ball valve assembly (10) by forming a body having a passage (4A), one end of which is of sufficient diameter (4A') to allow the valve components (14, 16, 18) to be moved into the passage (4A), inserting said components which comprising at least apertured ball valve (16) component and an apertured retainer (20) which retains the ball valve component within the assembly when the valve is closed and under fluid pressure and allows fluid to flow through the assembly when the ball valve is in an open condition, engaging the ball (16) with actuating means (30, 26, 28) to allow movement of the ball between open and closed positions, repeating the process to form a second ball valve assembly (12), bringing the assemblies together so that the end faces in which the retainers are located are adjacent and the passages in respective assemblies are aligned and connecting the assemblies together to form the valve.

21. A method according to claim 20 characterised in that a venting arrangement (14) is fitted to either one of the assemblies (10, 12) or to a member positioned between said assemblies when engaged.

* * * * *